(12) United States Patent
Suzuki et al.

(10) Patent No.: US 12,163,581 B2
(45) Date of Patent: Dec. 10, 2024

(54) VEHICLE DRIVE DEVICE

(71) Applicant: AISIN CORPORATION, Aichi (JP)

(72) Inventors: Tomoyuki Suzuki, Kariya (JP);
Nozomu Takahashi, Kariya (JP)

(73) Assignee: AISIN CORPORATION, Kariya (JP)

(*) Notice: Subject to any disclaimer, the term of this patent is extended or adjusted under 35 U.S.C. 154(b) by 0 days.

(21) Appl. No.: 18/285,446

(22) PCT Filed: Jun. 29, 2022

(86) PCT No.: PCT/JP2022/025946
§ 371 (c)(1),
(2) Date: Oct. 3, 2023

(87) PCT Pub. No.: WO2023/277059
PCT Pub. Date: Jan. 5, 2023

(65) Prior Publication Data
US 2024/0183439 A1 Jun. 6, 2024

(30) Foreign Application Priority Data

Jun. 30, 2021 (JP) .................................. 2021-109499

(51) Int. Cl.
| | |
|---|---|
| *F16H 57/027* | (2012.01) |
| *B60K 1/00* | (2006.01) |
| *B60K 11/06* | (2006.01) |
| *B60L 15/00* | (2006.01) |
| *F16H 57/037* | (2012.01) |

(Continued)

(52) U.S. Cl.
CPC ............ *F16H 57/027* (2013.01); *B60K 1/00* (2013.01); *B60K 11/06* (2013.01); *B60L 15/007* (2013.01); *F16H 57/037* (2013.01); *F16H 57/045* (2013.01); *H02K 9/02* (2013.01); *B60K 2001/001* (2013.01); *B60K 2001/003* (2013.01); *F16H 2057/02026* (2013.01);

(Continued)

(58) Field of Classification Search
CPC ...... H02K 2205/09; H02K 9/02; H02K 7/116; B60L 15/007; B60K 1/00; B60K 2001/001; F16H 57/027; F16H 57/037; F16H 57/045; F16H 2057/02026; F16H 2057/02034; F16H 2057/02052
See application file for complete search history.

(56) References Cited

U.S. PATENT DOCUMENTS

| | | | |
|---|---|---|---|
| 2009/0206709 A1* | 8/2009 | Kakuda | H02K 5/15 310/68 D |
| 2021/0001713 A1 | 1/2021 | Sakurada et al. | |
| 2021/0095752 A1* | 4/2021 | Hensel | B60K 1/00 |

FOREIGN PATENT DOCUMENTS

| | | | | |
|---|---|---|---|---|
| JP | 2014-79110 A | | 5/2014 | |
| JP | 2020174479 A | * | 10/2020 | ............... H02K 5/20 |
| JP | 2021-10269 A | | 1/2021 | |

* cited by examiner

*Primary Examiner* — Tisha D Lewis
(74) *Attorney, Agent, or Firm* — Oliff PLC (57) ABSTRACT

A second axis is located on a lower side with respect to a first axis and on a first widthwise side with respect to the first axis. An inverter device is disposed on the first widthwise side with respect to the second axis so that a disposition area in an up-down direction overlaps a rotary electric machine and a pair of output members. At least a part of a breather chamber is disposed between the rotary electric machine and the inverter device in a width direction in an area in the up-down direction where both the rotary electric machine and the inverter device are disposed.

9 Claims, 4 Drawing Sheets (51) Int. Cl.
  *F16H 57/04* (2010.01)
  *H02K 9/02* (2006.01)
  *F16H 57/02* (2012.01)
(52) U.S. Cl.
  CPC .............. *F16H 2057/02034* (2013.01); *F16H 2057/02052* (2013.01); *H02K 2205/09* (2013.01)

VEHICLE DRIVE DEVICE

TECHNICAL FIELD

The present disclosure relates to a vehicle drive device including a rotary electric machine, a transmission mechanism that transmits a driving force between the rotary electric machine and a pair of output members, an inverter device that controls drive of the rotary electric machine, a case, and a breather device that communicates the inside and outside of the case.

BACKGROUND ART

An example of such a vehicle drive device is disclosed in Japanese Unexamined Patent Application Publication No. 2014-79110 (JP 2014-79110 A) (Patent Document 1). The reference signs shown in parentheses in the description of the background art are those of Patent Document 1. The vehicle drive device of Patent Document 1 includes a motor (3), an automatic transmission (5) and a differential device (7) that transmit a driving force between the motor (3) and a pair of drive shafts (8), an inverter (10) that controls drive of the motor (3), a housing (15), and a breather (30) that communicates the inside and outside of the housing (15).

RELATED ART DOCUMENTS

Patent Documents

Patent Document 1: Japanese Unexamined Patent Application Publication No. 2014-79110 (JP 2014-79110 A)

SUMMARY OF THE DISCLOSURE

Problem to be Solved by the Disclosure

Patent Document 1 does not describe a specific disposition configuration of the inverter device. In the vehicle drive device described above, however, the dimensions of the vehicle drive device increase unless the parts constituting the vehicle drive device are disposed appropriately, including the disposition of the inverter device and the breather device. Thus, the mountability of the vehicle drive device on the vehicle may decrease.

In view of this, there is a demand to realize a technology that facilitates downsizing of the vehicle drive device when the vehicle drive device includes the inverter device and the breather device.

Means for Solving the Problem

A vehicle drive device according to the present disclosure includes a rotary electric machine, a pair of output members drivingly connected to a pair of wheels, a transmission mechanism configured to transmit a driving force between the rotary electric machine and the pair of output members, an inverter device configured to control drive of the rotary electric machine, a case that houses the inverter device, the rotary electric machine, and the transmission mechanism and includes an oil reservoir inside, and a breather device including a breather chamber that communicates an inside and an outside of the case. The rotary electric machine and the pair of output members are disposed separately on two parallel axes. Assuming that a first axis is a rotation axis of the rotary electric machine, a second axis is a rotation axis of the pair of output members, an axial direction is a direction parallel to the first axis and the second axis, a width direction is a direction orthogonal to the axial direction in an up-down view, and a first widthwise side is one side in the width direction, the second axis is located on the first widthwise side with respect to the first axis, the inverter device is disposed on the first widthwise side with respect to the second axis so that a disposition area in an up-down direction overlaps the rotary electric machine and the pair of output members, and at least a part of the breather chamber is disposed between the rotary electric machine and the inverter device in the width direction, and a disposition area of the at least part of the breather chamber in the up-down direction overlaps the rotary electric machine and the inverter device and the at least part of the breather chamber is located on an upper side of the first axis.

According to this configuration, the inverter device is disposed so that the disposition area in the up-down direction overlaps the rotary electric machine and the pair of output members. Therefore, it is possible to suppress an increase in the size of the vehicle drive device in the up-down direction due to the disposition of the inverter device. In this configuration, the second axis is located on the first widthwise side with respect to the first axis, and the inverter device is disposed on the first widthwise side with respect to the second axis. Therefore, a space (hereinafter referred to as "target space") shaped so as to be surrounded from three sides that are both sides in the width direction and a lower side is formed by the outer peripheral surface of the rotary electric machine and the inverter device in an axial view along the axial direction. According to this configuration, the breather chamber can be disposed by using the target space. Therefore, the amount of protrusion of the breather device including the breather chamber in the up-down direction (specifically, the amount of protrusion from the uppermost part of the case in the axial view) can easily be reduced, and the vehicle drive device can easily be downsized in the up-down direction.

By disposing the breather chamber with the target space as described above, at least a part of the breather chamber can easily be disposed in an area in the axial direction where at least one of the rotary electric machine and the inverter device is disposed. Therefore, according to this configuration, the vehicle drive device can easily be downsized in the axial direction.

As described above, with this configuration, the downsizing of the vehicle drive device is facilitated when the vehicle drive device includes the inverter device and the breather device.

Further features and advantages of the vehicle drive device will become apparent from the following description of an embodiment that will be given with reference to the drawings.

MODES FOR CARRYING OUT THE DISCLOSURE

An embodiment of a vehicle drive device will be described with reference to the drawings. In the following description, an up-down direction V (see FIG. 4 etc.) is a direction along the vertical direction of a vehicle drive device 100 in use, that is, a direction along the vertical direction when the vehicle drive device 100 is disposed in a direction in which it is used. Since the vehicle drive device 100 is mounted on a vehicle 200 (see FIG. 1) in use, the up-down direction V is a direction along the vertical direction in a state in which the vehicle drive device 100 is mounted on the vehicle 200 (hereinafter referred to as "vehicle-mounted state"), more specifically, a direction along the vertical direction when the vehicle 200 is in the vehicle-mounted state and is stopped on a flat road (road along a horizontal plane). An upper side V1 and a lower side V2 mean an upper side and a lower side in the up-down direction V. The direction of each member in the following description represents a direction of the member mounted on the vehicle drive device 100. Terms related to the dimension, the disposition direction, the disposition position, and the like of each member represent concepts that include a state in which there is a difference due to a variation (variation to an extent permissible in manufacturing).

The term "drivingly connected" herein refers to a state in which two rotation elements are connected so that a driving force (synonymous with torque) can be transmitted, and includes a state in which the two rotation elements are connected so as to rotate integrally or a state in which the two rotation elements are connected so as to be able to transmit a driving force via one, two, or more transmission members. Such transmission members include various members that transmit rotation at the same speed or at a shifted speed (such as a shaft, a gear mechanism, a belt, and a chain). The transmission members may include an engagement device that selectively transmits rotation and a driving force (such as a friction engagement device and an inter-mesh engagement device).

The "rotary electric machine" is herein used as a concept including any of a motor (electric motor), a generator (power generator), and a motor generator that functions as both a motor and a generator if necessary. Regarding the disposition of two members, the phrase "overlap when viewed in a specific direction" herein means that, when an imaginary straight line parallel to the line-of-sight direction is moved in directions orthogonal to the imaginary straight line, an area where the imaginary straight line intersects both the two members is present at least in part. Regarding the disposition of the two members, the phrase "disposition areas in a specific direction overlap each other" herein means that a disposition area of one member in the specific direction includes at least a part of a disposition area of the other member in the specific direction.

Figure 3:
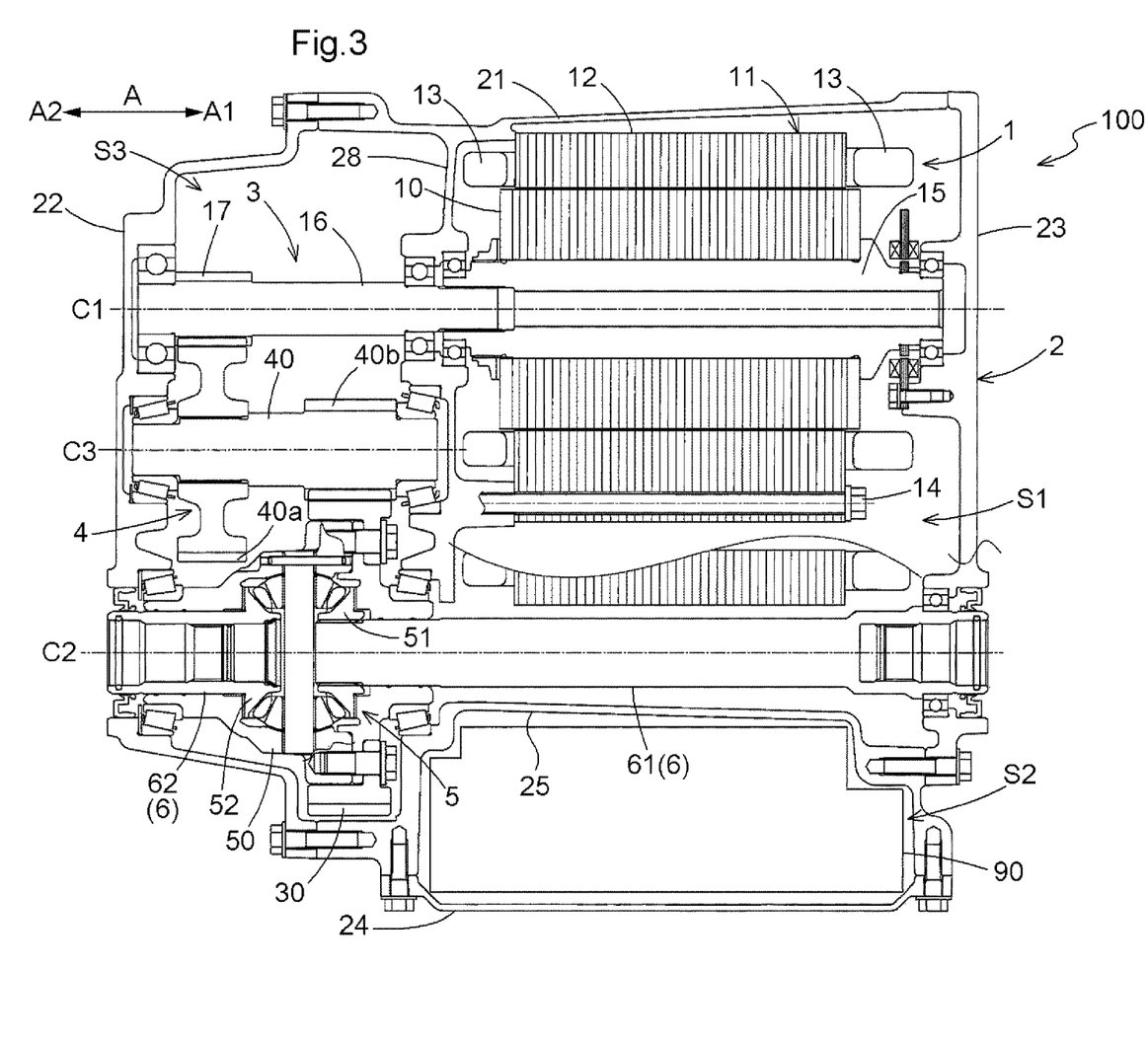
FIG. 3 is a sectional view of the vehicle drive device according to the embodiment.

As shown in FIG. 3, the vehicle drive device 100 includes a rotary electric machine 1, a pair of output members 6 drivingly connected to a pair of wheels W (see FIG. 1), a transmission mechanism 3 that transmits a driving force between the rotary electric machine 1 and the pair of output members 6, an inverter device 90 that controls drive of the rotary electric machine 1, and a case 2. The case 2 houses the inverter device 90, the rotary electric machine 1, and the transmission mechanism 3. The case 2 also houses the pair of output members 6. An oil reservoir OR is provided inside the case 2.

Figure 1:
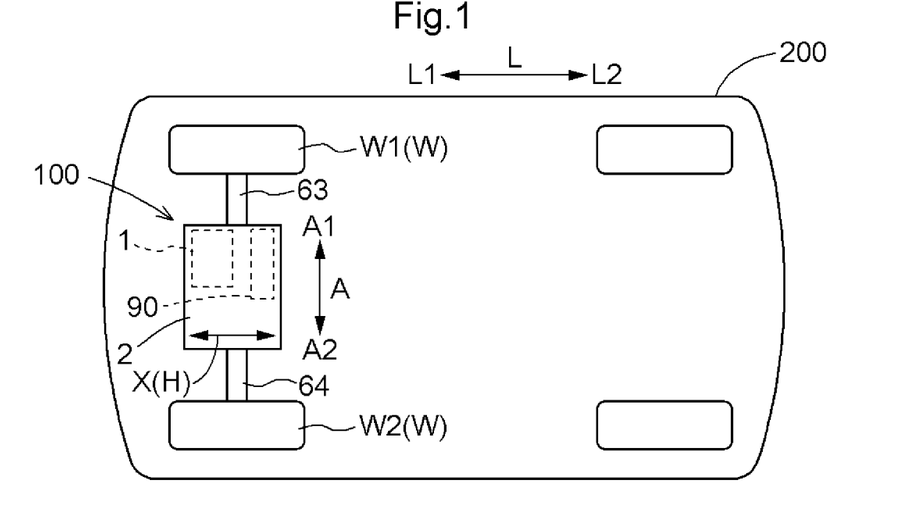
FIG. 1 is a schematic diagram of a vehicle including a vehicle drive device according to an embodiment.

A first output member 61 that is one of the pair of output members 6 is drivingly connected to a first wheel W1 that is one of the pair of wheels W, and a second output member 62 that is the other of the pair of output members 6 is drivingly connected to a second wheel W2 that is the other of the pair of wheels W. As shown in FIG. 1, the vehicle 200 including the vehicle drive device 100 includes a first drive shaft 63 that rotates integrally with the first wheel W1, and a second drive shaft 64 that rotates integrally with the second wheel W2. The first drive shaft 63 is connected to the first wheel W1, for example, via a constant velocity joint, and the second drive shaft 64 is connected to the second wheel W2, for example, via a constant velocity joint. The first output member 61 is connected to the first drive shaft 63 so as to rotate integrally with the first drive shaft 63, and the second output member 62 is connected to the second drive shaft 64 so as to rotate integrally with the second drive shaft 64.

The vehicle drive device 100 transmits an output torque of the rotary electric machine 1 to the pair of wheels W via the pair of output members 6 to cause the vehicle 200 including the vehicle drive device 100 to travel. That is, the rotary electric machine 1 is a driving force source for the pair of wheels W. The pair of wheels W is a pair of right and left wheels (for example, a pair of right and left front wheels or a pair of right and left rear wheels) in the vehicle 200. In the present embodiment, the rotary electric machine 1 is an alternating-current rotary electric machine to be driven by a three-phase alternating current (example of a multiphase alternating current). The rotary electric machine 1 is electrically connected to a power storage device such as a battery or a capacitor via the inverter device 90 that performs power conversion between direct current power and alternating current power, and is supplied with electric power from the power storage device to perform power running or supply electric power generated by, for example, inertial force of the vehicle 200 to the power storage device to store the electric power.

As shown in FIG. 3, the rotary electric machine 1 and the pair of output members 6 are disposed separately along two parallel axes (specifically, a first axis C1 and a second axis C2). Specifically, the rotary electric machine 1 is disposed on the first axis C1, and the pair of output members 6 is disposed on the second axis C2 different from the first axis C1. The transmission mechanism 3 includes an output gear 30 drivingly connected to at least one of the pair of output members 6 coaxially with the pair of output members 6 (that is, on the second axis C2).

As shown in FIG. 1, the vehicle drive device 100 is mounted on the vehicle 200 with an axial direction A along a vehicle right-left direction. The axial direction A is a direction parallel to the first axis C1 and the second axis C2, in other words, an axial direction common to the first axis C1 and the second axis C2. That is, the axial direction A is a direction in which the rotation axis of the rotary electric machine 1 extends, and is also a direction in which the rotation axis of the pair of output members 6 extends. One side in the axial direction A is defined as a first axial side A1, and the other side in the axial direction A (opposite to the first axial side A1 in the axial direction A) is defined as a second axial side A2. The first axial side A1 is a side where the rotary electric machine 1 is disposed with respect to the transmission mechanism 3 in the axial direction A. As shown in FIG. 3, the first output member 61 is the output member 6 disposed on the first axial side A1 out of the pair of output members 6, and the second output member 62 is the output member 6 disposed on the second axial side A2 out of the pair of output members 6.

As shown in FIG. 1, in the present embodiment, the vehicle drive device 100 is mounted on the vehicle 200 with the first axial side A1 being a right side of the vehicle and the second axial side A2 being a left side of the vehicle. Therefore, the first wheel W1 to which the first output member 61 is drivingly connected is a right wheel, and the second wheel W2 to which the second output member 62 is drivingly connected is a left wheel. In FIG. 1, it is assumed that the vehicle drive device 100 is a drive device of front-wheel drive that drives a pair of right and left front wheels. Therefore, in the example shown in FIG. 1, the first wheel W1 is the right front wheel, and the second wheel W2 is the left front wheel.

As shown in FIG. 3, the rotary electric machine 1 includes a rotor 10 and a stator 11. The stator 11 is fixed to the case 2, and the rotor 10 is supported by the case 2 so as to be rotatable relative to the stator 11. In the present embodiment, the stator 11 is fixed to the case 2 by using fastening members 14 such as fastening bolts. In the present embodiment, the rotary electric machine 1 is an inner rotor type rotary electric machine, and the rotor 10 is disposed on a radially inner side of the stator 11 so as to overlap the stator 11 in a radial view along a radial direction. The radial direction is a radial direction with respect to the first axis C1, in other words, a radial direction with respect to the rotation axis of the rotary electric machine 1.

Figure 5:
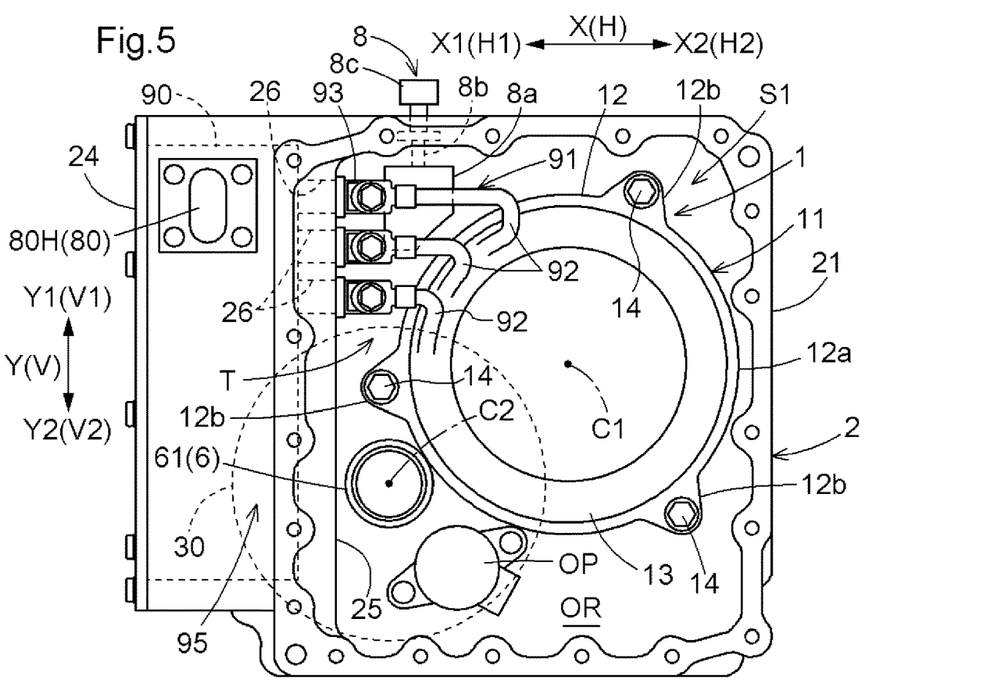
FIG. 5 is a diagram showing the disposition relationship of the components of the vehicle drive device according to the embodiment in the axial view.

The stator 11 includes a stator core 12 and coil end portions 13 protruding in the axial direction A from the stator core 12. A coil is wound around the stator core 12, and a portion of the coil protruding in the axial direction A from the stator core 12 forms the coil end portion 13. The coil end portions 13 are formed on both sides in the axial direction A with respect to the stator core 12. As shown in FIG. 5, in the present embodiment, the stator core 12 includes a body 12a having a cylindrical shape extending in the axial direction A, and protruding portions 12b formed so as to protrude outward in the radial direction (radial direction with respect to the first axis C1) from the body 12a. The protruding portions 12b have insertion holes through which the fastening members 14 for fixing the stator core 12 to the case 2 are inserted.

As shown in FIG. 3, the transmission mechanism 3 includes an input member 16 drivingly connected to the rotary electric machine 1 coaxially with the rotary electric machine 1 (that is, on the first axis C1). In the present embodiment, the input member 16 is connected to the rotor 10 so as to rotate integrally with the rotor 10. In the example shown in FIG. 3, the vehicle drive device 100 includes a rotor shaft 15 to which the rotor 10 is fixed, and the input member 16 is connected to the rotor shaft 15 so as to rotate integrally with the rotor shaft 15. Specifically, a part of the input member 16 on the first axial side A1 is connected (in this case, spline-connected) to a part of the rotor shaft 15 on the second axial side A2. Unlike such a configuration, the configuration may be such that the vehicle drive device 100 does not include the rotor shaft 15 and the rotor 10 is fixed to the input member 16 (specifically, the part of the input member 16 on the first axial side A1).

As shown in FIG. 3, the transmission mechanism 3 includes a differential gear mechanism 5 in the present embodiment. The differential gear mechanism 5 distributes the driving force transmitted from the rotary electric machine 1 side to the pair of output members 6. In the present embodiment, the differential gear mechanism 5 is disposed coaxially with the pair of output members 6 (that is, on the second axis C2), and distributes, to the pair of output members 6, the driving force transmitted from the rotary electric machine 1 side to the output gear 30. That is, in the present embodiment, the output gear 30 is drivingly connected to both of the pair of output members 6 via the differential gear mechanism 5. In the present embodiment, the differential gear mechanism 5 is a bevel gear type differential gear mechanism, and the output gear 30 is connected to a differential case 50 of the differential gear mechanism 5 so as to rotate integrally with the differential case 50. The differential case 50 houses a first side gear 51 and a second side gear 52. The differential gear mechanism 5 distributes rotation of the output gear 30 to the first side gear 51 and the second side gear 52. The differential gear mechanism 5 is disposed on the second axial side A2 with respect to the rotary electric machine 1.

The first side gear 51 rotates integrally with the first output member 61, and the second side gear 52 rotates integrally with the second output member 62. In the present embodiment, the first side gear 51 is formed on a member different from the member that constitutes the first output member 61 (in this case, a shaft member), and is connected (in this case, spline-connected) to the first output member 61 so as to rotate integrally with the first output member 61. At least a part of the first output member 61 on the first axial side A1 has a tubular shape (specifically, a cylindrical shape) extending in the axial direction A, and the first drive shaft 63 (see FIG. 1) is inserted from the first axial side A1 into the first output member 61 (space surrounded by an inner peripheral surface). In the present embodiment, the second side gear 52 is formed on a member that constitutes the second output member 62 (in this case, a shaft member). Specifically, the second side gear 52 is formed at an end of the second output member 62 on the first axial side A1. At least a part of the second output member 62 on the second axial side A2 has a tubular shape (specifically, a cylindrical shape) extending in the axial direction A, and the second drive shaft 64 (see FIG. 1) is inserted from the second axial side A2 into the second output member 62 (space surrounded by an inner peripheral surface).

As shown in FIG. 3, in the present embodiment, the transmission mechanism 3 includes a counter gear mechanism 4 disposed on a different axis from those of the rotary electric machine 1 and the output gear 30 in a power transmission path between the rotary electric machine 1 and the output gear 30. The counter gear mechanism 4 is disposed on a third axis C3 different from the first axis C1 and the second axis C2. The third axis C3 is parallel to the first axis C1 and the second axis C2. In the present embodiment, the counter gear mechanism 4 includes a counter input gear 40a that meshes with an input gear 17 that rotates integrally with the input member 16, a counter output gear 40b that meshes with the output gear 30, and a counter shaft 40 that connects the counter input gear 40a and the counter output gear 40b. The input gear 17 is disposed on the second axial side A2 with respect to the rotary electric machine 1, and the counter gear mechanism 4 is disposed on the second axial side A2 with respect to the rotary electric machine 1. In the present embodiment, the counter input gear 40a is disposed on the second axial side A2 with respect to the counter output gear 40b.

In the present embodiment, the counter input gear 40a has a larger diameter than the input gear 17, and the counter output gear 40b has a smaller diameter than the output gear 30. Therefore, the speed of rotation of the input member 16 is reduced based on a gear ratio between the input gear 17 and the counter input gear 40*a*, and is further reduced based on a gear ratio between the counter output gear 40*b* and the output gear 30 (that is, reduced in two stages). Thus, the rotation is transmitted to the output gear 30.

Figure 2:
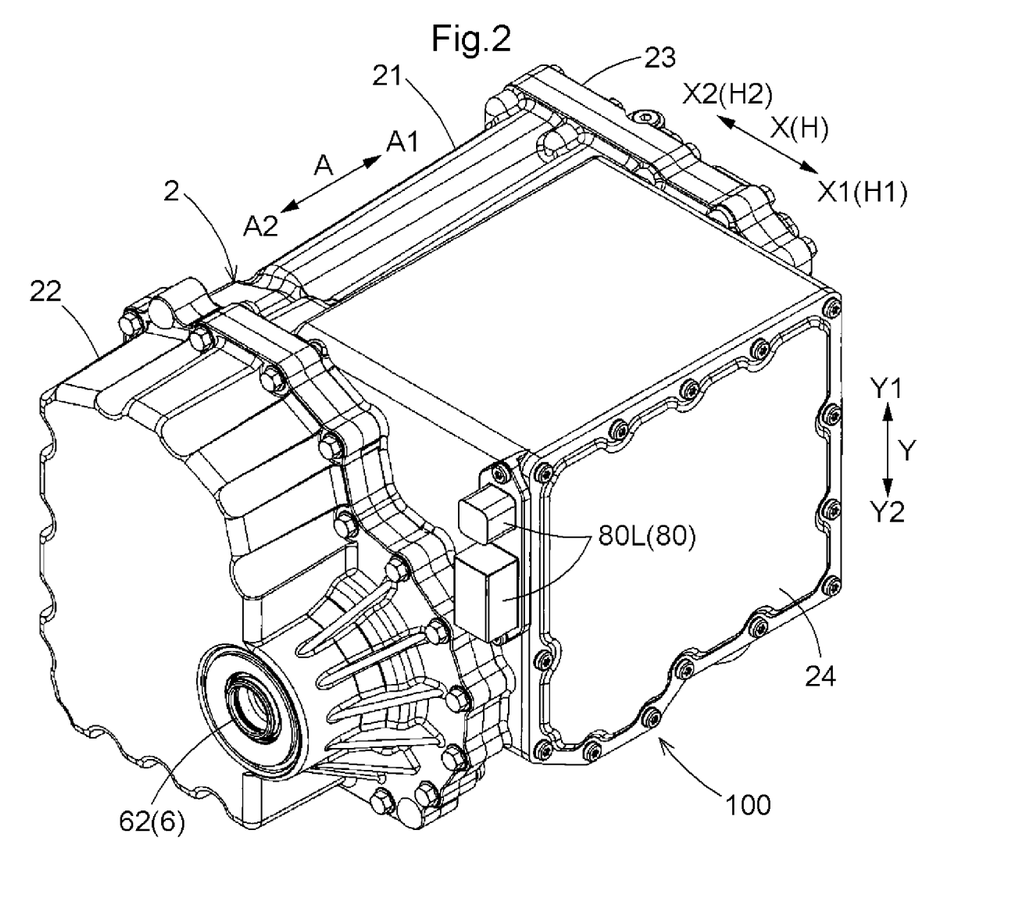
FIG. 2 is a perspective view of the vehicle drive device according to the embodiment.
Figure 6:
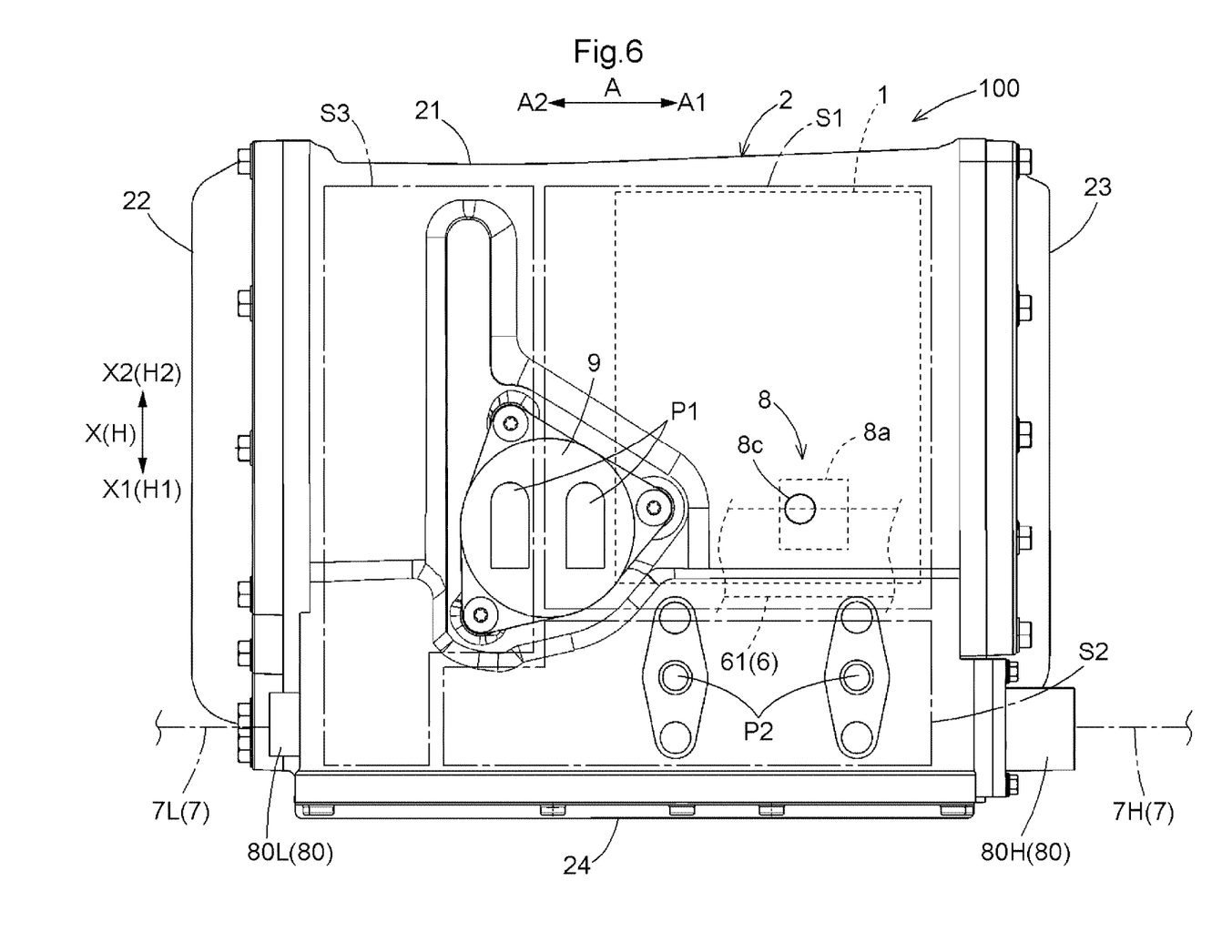
FIG. 6 is a plan view of the vehicle drive device according to the embodiment.

As shown in FIGS. 2 and 3, the case 2 includes a first case portion 21, a second case portion 22, and a third case portion 23 in the present embodiment. The second case portion 22 is joined to the second axial side A2 of the first case portion 21, and the third case portion 23 is joined to the first axial side A1 of the first case portion 21. The rotary electric machine 1 is housed in a space surrounded by the first case portion 21 and the third case portion 23, and the transmission mechanism 3 is housed in a space surrounded by the first case portion 21 and the second case portion 22. In this way, the case 2 includes a rotary electric machine housing chamber S1 that houses the rotary electric machine 1, and a transmission mechanism housing chamber S3 that houses the transmission mechanism 3. The housing chamber forms a housing space that houses an object to be housed. As shown in FIGS. 3 and 6, the rotary electric machine housing chamber S1 and the transmission mechanism housing chamber S3 are arranged in the axial direction A. In the present embodiment, the first output member 61 is housed in the rotary electric machine housing chamber S1. Specifically, at least a part of the first output member 61 that overlaps the rotary electric machine 1 in the axial direction A (overlapping part in a disposition area in the axial direction A) is housed in the rotary electric machine housing chamber S1. In this way, in the present embodiment, the rotary electric machine 1 and the first output member 61 are housed in a common housing chamber (specifically, the rotary electric machine housing chamber S1) of the case 2.

In the present embodiment, the case 2 further includes an inverter housing chamber S2 that houses the inverter device 90. Specifically, the case 2 includes a fourth case portion 24 joined to the first case portion 21, and the inverter device 90 is housed in a space surrounded by the first case portion 21 and the fourth case portion 24 (inverter housing chamber S2). The inverter device 90 is housed in the inverter housing chamber S2 while being fixed to the case 2 with bolts or the like. In the present embodiment, the inverter housing chamber S2 is formed in the first case portion 21 so as to be open to a first-direction first side X1 (see FIG. 2) described later, and the fourth case portion 24 is joined to the first case portion 21 so as to close the opening. Although details are omitted, the inverter device 90 includes a switching element unit (power module) including a plurality of switching elements constituting an inverter circuit, a control board on which a control device for controlling the inverter circuit is mounted, and a smoothing capacitor for smoothing a voltage between positive and negative electrodes on a direct current side of the inverter circuit. The switching element unit, the control board, and the smoothing capacitor are housed in the inverter housing chamber S2. Thus, in the present embodiment, the rotary electric machine housing chamber S1 and the inverter housing chamber S2 are integrally formed in the single case 2.

As shown in FIG. 3, the case 2 includes a partition wall 25 (demarcation wall) that demarcates the rotary electric machine housing chamber S1 and the inverter housing chamber S2. In the present embodiment, the rotary electric machine housing chamber S1 and the inverter housing chamber S2 are formed integrally in the case 2 (in this case, the first case portion 21). Specifically, the rotary electric machine housing chamber S1 and the inverter housing chamber S2 are formed in one member (for example, one member formed by die casting and made of a common material). In the present embodiment, the rotary electric machine housing chamber S1 and the inverter housing chamber S2 are demarcated by one partition wall 25.

Figure 4:
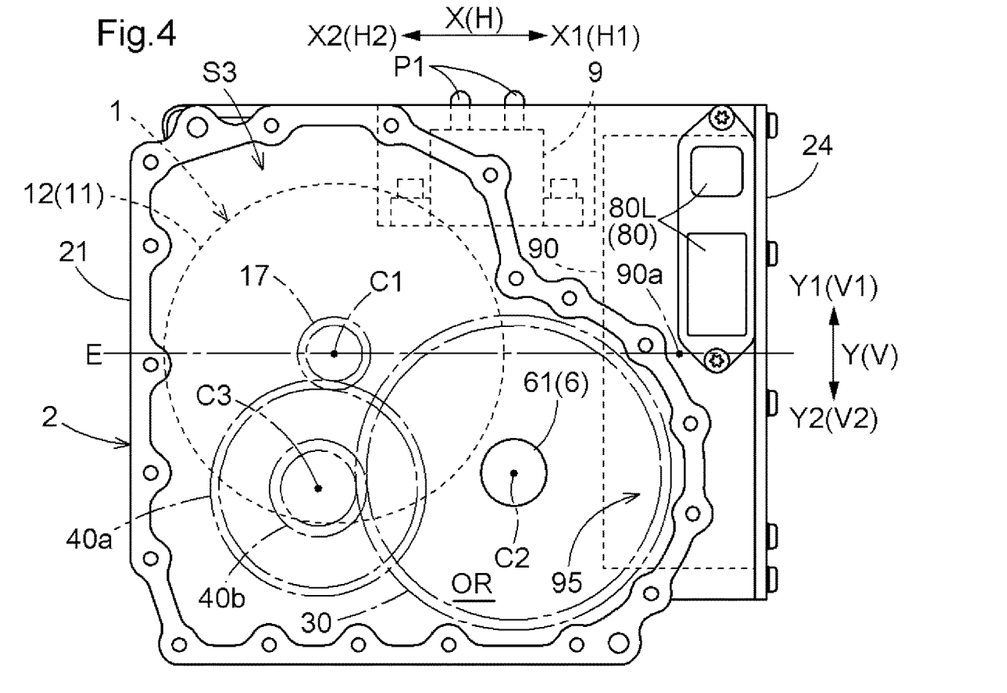
FIG. 4 is a diagram showing a disposition relationship of components of the vehicle drive device according to the embodiment in an axial view.

As shown in FIG. 2, in the present embodiment, the case 2 is provided with connectors 80 for electrically connecting cables 7 (see FIG. 6) disposed outside the case 2 and the inverter device 90. FIG. 6 simply shows the cables 7. As shown in FIGS. 4 to 6, the connectors 80 include a low-voltage connector 80L and a high-voltage connector 80H that relays electric power at a voltage higher than that of the low-voltage connector 80L. A power supply line (example of a low-voltage cable 7L) for supplying electric power to the control board of the inverter device 90 and a signal line (example of the low-voltage cable 7L) for transmitting a control signal to the control board are connected to the low-voltage connector 80L. A power supply line (example of a high-voltage cable 7H) for supplying electric power to the inverter circuit of the inverter device 90 is connected to the high-voltage connector 80H.

As shown in FIG. 4, in the axial view along the axial direction A, a direction in which the rotary electric machine 1 and the inverter device 90 are arranged is defined as a first direction X, and a direction orthogonal to both the axial direction A and the first direction X is defined as a second direction Y In the present embodiment, the first direction X is identical to a width direction H described later, and the second direction Y is identical to the up-down direction V. One side in the first direction X is defined as the first-direction first side X1, and the other side in the first direction X (opposite to the first-direction first side X1 in the first direction X) is defined as a first-direction second side X2. One side in the second direction Y is defined as a second-direction first side Y1, and the other side in the second direction Y (opposite to the second-direction first side Y1 in the second direction Y) is defined as a second-direction second side Y2. The first-direction first side X1 is a side where the inverter device 90 is disposed with respect to the rotary electric machine 1 in the first direction X. In FIG. 4, the outer peripheral surface of the stator core 12 (specifically, the body 12*a* described above) is represented by a dashed line, the root circle and the tip circle of each gear are represented by long dashed short dashed lines, and the outer peripheral surface of the first output member 61 (specifically, the outer peripheral surface of a part of the first output member 61 that is interposed between the rotary electric machine 1 and the inverter device 90 in the first direction X) is represented by a continuous line.

In the present embodiment, the vehicle drive device 100 is mounted on the vehicle 200 with the second-direction first side Y1 being the upper side V1 and the second-direction second side Y2 being the lower side V2. In the present embodiment, the vehicle drive device 100 is mounted on the vehicle 200 with the first-direction second side X2 being a front side L1 (front side in a vehicle front-rear direction L) and the first-direction first side X1 being a rear side L2 (rear side in the vehicle front-rear direction L). As shown in FIG. 1, in the present embodiment, the vehicle drive device 100 is mounted on the front side L1 of a central portion of the vehicle 200 in the vehicle front-rear direction L. Therefore, the first-direction first side X1 that is the side where the inverter device 90 is disposed with respect to the rotary electric machine 1 in the first direction X and is the rear side L2 in the present embodiment is close to the center in the vehicle front-rear direction L. Therefore, in the present embodiment, the inverter device 90 is disposed closer to the center in the vehicle front-rear direction L than the rotary electric machine 1 in the vehicle-mounted state. When the vehicle drive device 100 is mounted on the rear side L2 of the central portion of the vehicle 200 in the vehicle front-rear direction L, the vehicle drive device 100 is mounted on the vehicle 200 with the first-direction second side X2 being the rear side L2 and the first-direction first side X1 being the front side L1. Thus, the inverter device 90 can be disposed closer to the center in the vehicle front-rear direction L than the rotary electric machine 1. In this way, when the vehicle drive device 100 is mounted on the rear side L2 of the central portion of the vehicle 200 in the vehicle front-rear direction L, the pair of wheels W to be driven by the vehicle drive device 100 is, for example, a pair of right and left rear wheels.

When the vehicle 200 includes the pair of right and left front wheels and the pair of right and left rear wheels, one of the pair of right and left front wheels and the pair of right and left rear wheels that is not driven by the vehicle drive device 100 (pair of right and left rear wheels in the example shown in FIG. 1) may be driven by a drive device other than the vehicle drive device 100. The drive device other than the vehicle drive device 100 is, for example, a drive device configured to transmit an output torque of an internal combustion engine (example of a driving force source other than the rotary electric machine) to a pair of wheels to be driven, a drive device configured to transmit an output torque of a rotary electric machine (rotary electric machine different from the rotary electric machine 1 of the vehicle drive device 100) to the pair of wheels to be driven, or a drive device configured to transmit the output torques of both the internal combustion engine and the rotary electric machine (rotary electric machine different from the rotary electric machine 1 of the vehicle drive device 100) to the pair of wheels to be driven. The drive device other than the vehicle drive device 100 may be a drive device having the same configuration as that of the vehicle drive device 100.

The width direction H is defined as a direction orthogonal to the axial direction A in an up-down view along the up-down direction V. In the present embodiment, the width direction H is defined as a horizontal direction orthogonal to the axial direction A (that is, a direction orthogonal to the axial direction A and the up-down direction V). As shown in FIG. 4, in the present embodiment, the rotary electric machine 1 and the inverter device 90 are disposed so that their disposition areas in the up-down direction V overlap each other. Therefore, the width direction H can be defined as the first direction X as an example. In this case, the second direction Y is parallel to the up-down direction V as shown in FIG. 4. As another example, a direction along an imaginary straight line E passing through the first axis C1 and a center 90a of the inverter device 90 in the axial view may be defined as the first direction X. The center 90a of the inverter device 90 in the axial view can be the center of gravity of a figure defining the outer shape (outer edge) of the inverter device 90 in the axial view. In the example shown in FIG. 4, the figure defining the outer shape of the inverter device 90 in the axial view is a figure having a rectangular shape (in this case, a rectangular shape elongated in the second direction Y, in other words, a rectangular shape elongated in the up-down direction V). The center of gravity of the rectangular shape (specifically, an intersection of diagonal lines) can be the center 90a of the inverter device 90 in the axial view. In the example shown in FIG. 4, the width direction H and the direction along the imaginary straight line E in the axial view are parallel to each other. That is, in the example shown in FIG. 4, the first direction X is defined as the same direction by either of the above two definitions. One side in the width direction H (in the present embodiment, agrees with the first-direction first side X1) is defined as a first widthwise side H1, and a side opposite to the first widthwise side H1 (in the present embodiment, agrees with the first-direction second side X2) is defined as a second widthwise side H2.

As shown in FIG. 4, in the present embodiment, the first output member 61 is interposed between the rotary electric machine 1 and the inverter device 90 in the first direction X at a position in the second direction Y where both the rotary electric machine 1 and the inverter device 90 are disposed. The part of the first output member 61 interposed between the rotary electric machine 1 and the inverter device 90 in the first direction X is disposed so that the disposition area in the axial direction A overlaps the rotary electric machine 1 and also overlaps the inverter device 90 (see FIG. 3). As shown in FIG. 4, the output gear 30 is disposed so as to overlap the rotary electric machine 1 and the inverter device 90 in the axial view. Specifically, the output gear 30 is disposed so that a part of the output gear 30 on the first-direction second side X2 overlaps the rotary electric machine 1 in the axial view and a part of the output gear 30 on the first-direction first side X1 overlaps the inverter device 90 in the axial view. As shown in FIG. 3, the output gear 30 is disposed on one side in the axial direction A (specifically, the second axial side A2) with respect to the rotary electric machine 1 and the inverter device 90. The rotary electric machine 1 and the inverter device 90 are disposed so that their disposition areas in the axial direction A overlap each other. In the present embodiment, at least a part of the inverter device 90 (only a part in the example shown in FIG. 4) is disposed on the lower side V2 of the second axis C2 in the vehicle-mounted state. The entire inverter device 90 may be disposed on the upper side V1 of the second axis C2 in the vehicle-mounted state.

As described above, in the present embodiment, the output gear 30 is disposed so as to overlap the rotary electric machine 1 and the inverter device 90 in the axial view. Therefore, as shown in FIGS. 4 and 5, the inverter device 90 includes an overlapping portion 95 disposed so as to overlap the output gear 30 in the axial view. The connectors 80 (specifically, the low-voltage connector 80L and the high-voltage connector 80H) are disposed in an area of the case 2 that is on the upper side V1 of the overlapping portion 95 (in other words, a part of the case 2 that overlaps the overlapping portion 95 in the axial view) and overlaps the inverter device 90 in the axial view (hereinafter referred to as "target area"). As shown in FIG. 2, the connectors 80 are disposed on the end faces of the case 2 in the axial direction A.

As shown in FIG. 4, in the present embodiment, the inverter device 90 is disposed, for example, over a range in the up-down direction V from the lower side V2 of the second axis C2 to the upper side V1 of the upper end of the output gear 30. Since the inverter device 90 is disposed in this way, a part on the upper side V1 of the overlapping portion 95 in the area of the case 2 that overlaps the inverter device 90 in the axial view is likely to be a dead space. Since the connector 80 is disposed in the target area in the vehicle drive device 100, the connector 80 can be disposed by effectively using the area that is likely to be the dead space.

As shown in FIGS. 4 to 6, in the present embodiment, the low-voltage connector 80L and the high-voltage connector 80H are disposed, for example, opposite to each other in the axial direction A across the inverter device 90. Specifically, the low-voltage connector 80L is disposed on the end face of the case 2 on the second axial side A2 (see FIG. 2), and the high-voltage connector 80H is disposed on the end face of the case 2 on the first axial side A1. When the low-voltage connector 80L and the high-voltage connector 80H are disposed on the same side in the axial direction A with respect to the inverter device 90 unlike such a configuration, the distance between the low-voltage connector 80L and the high-voltage connector 80H is likely to be short, and noise may be put on a voltage (for example, a control signal) relayed by the low-voltage connector 80L due to influence of a voltage relayed by the high-voltage connector 80H. By disposing the low-voltage connector 80L and the high-voltage connector 80H opposite to each other in the axial direction A across the inverter device 90 as described above, a long distance can be secured between the low-voltage connector 80L and the high-voltage connector 80H. Thus, the above noise problem is less likely to occur.

In the present embodiment, the connectors 80 are disposed on the end faces of the case 2 in the axial direction A, and the vehicle drive device 100 is mounted on the vehicle 200 with the axial direction A along the vehicle right-left direction. By disposing the connector 80 on the end face of the case 2 in the vehicle right-left direction (right side or left side) in this way instead of the end face of the case 2 in the vehicle front-rear direction L (front side L1 or rear side L2) or the end face of the case 2 on the lower side V2, the connector 80 can be disposed at a position where it is less likely to be affected by a collision load in the event of collision of the vehicle 200. For example, when the vehicle drive device 100 is mounted in the rear part of the vehicle 200, mounting restrictions in the up-down direction V are likely to be strict. By disposing the connector 80 on the end face of the case 2 in the vehicle right-left direction (right side or left side) instead of the end face of the case 2 on the upper side V1, the dimension of the vehicle drive device 100 in the up-down direction V can be reduced and the mountability of the vehicle drive device 100 on the vehicle 200 can be secured easily.

As shown in FIG. 4, the first axis C1 that is the rotation axis of the rotary electric machine 1, the second axis C2 that is the rotation axis of the output gear 30 (in other words, the rotation axis of the pair of output members 6), and the third axis C3 that is the rotation axis of the counter gear mechanism 4 are located within the disposition area of the inverter device 90 in the up-down direction V. In the present embodiment, the third axis C3 is located opposite to the inverter device 90 in the first direction X (that is, on the first-direction second side X2) with respect to the second axis C2 in the axial view. In the present embodiment, the third axis C3 is also located on the first-direction second side X2 with respect to the first axis C1 in the axial view. In the present embodiment, the second axis C2 and the third axis C3 are located on the same side in the second direction Y (in this case, the second-direction second side Y2) with respect to the first axis C1 in the axial view. That is, the second axis C2 is located on the second-direction second side Y2 with respect to the first axis C1 in the axial view. In the vehicle-mounted state, the second axis C2 is located on the lower side V2 with respect to the imaginary straight line E in the axial view. The third axis C3 is located on the second-direction second side Y2 with respect to the first axis C1 in the axial view. In the vehicle-mounted state, the third axis C3 is located on the lower side V2 with respect to the imaginary straight line E in the axial view. In the present embodiment, the third axis C3 is located opposite to the center 90a of the inverter device 90 with respect to an imaginary straight line passing through the first axis C1 and the second axis C2 in the axial view.

In the example shown in FIG. 4, in the area in the up-down direction V where both the second axis C2 and the inverter device 90 are located, the second axis C2 is located on the second widthwise side H2 with respect to the inverter device 90. The end of the rotary electric machine 1 on the second widthwise side H2 is located on the second widthwise side H2 of the second axis C2. The third axis C3 is located on the first widthwise side H1 of the end of the rotary electric machine 1 (for example, the stator core 12 or the body 12a) on the second widthwise side H2. Since the second axis C2 and the third axis C3 are located in this way, the output gear 30 and the counter gear mechanism 4 can be disposed so that the entire or major parts thereof fit in the space in the width direction H between the end of the rotary electric machine 1 on the second widthwise side H2 and the inverter device 90. Therefore, the vehicle drive device 100 can be downsized in the width direction H. In the example shown in FIG. 4, the entire output gear 30 and the entire counter gear mechanism 4 are disposed in the space in the width direction H between the end of the rotary electric machine 1 on the second widthwise side H2 and the end of the inverter device 90 on the first widthwise side H1.

In the example shown in FIG. 4, the third axis C3 is located on the second widthwise side H2 of the second axis C2. The rotary electric machine 1 (specifically, the stator core 12) has a larger diameter than the counter gear mechanism 4, and the first axis C1 is located on the first widthwise side H1 of the third axis C3. The entire counter gear mechanism 4 is disposed on the first widthwise side H1 of the end of the rotary electric machine 1 (for example, the stator core 12 or the body 12a) on the second widthwise side H2. By disposing the rotary electric machine 1 and the counter gear mechanism 4 in this way, the rotary electric machine 1 can be disposed closer to the inverter device 90 in the width direction H within a range in which the counter gear mechanism 4 does not protrude from the rotary electric machine 1 to the second widthwise side H2. Therefore, the vehicle drive device 100 can be downsized in the width direction H. In the example shown in FIG. 4, the first axis C1 is located on the second widthwise side H2 of the second axis C2.

In the example shown in FIG. 4, the second axis C2 and the third axis C3 are located on the lower side V2 of the first axis C1. As described later, the oil reservoir OR for storing oil (lubricating or cooling oil) is formed in the lower part of the case 2 (see FIG. 4). When the second axis C2 and the third axis C3 are located in this way, the oil stored in the oil reservoir OR can be raked up by both the output gear 30 disposed on the second axis C2 and the gear disposed on the third axis C3 (in this example, the counter input gear 40a). Therefore, the lubricating performance and the cooling performance can be improved. In the example shown in FIG. 4, the lower end of the output gear 30 is located on the lower side V2 of both the lower end of the rotary electric machine 1 and the lower end of the counter gear mechanism 4. Thus, the oil can efficiently be raked up by the output gear 30.

In the example shown in FIG. 4, the inverter device 90 is disposed over a range in the up-down direction V from the lower side V2 of the second axis C2 to the upper side V1 of the upper end of the rotary electric machine 1 (for example, the stator core 12 or the body 12a). When the inverter device 90 is disposed in this way, the rotary electric machine 1 can be disposed so that the entire or major part thereof fits in the disposition area of the inverter device 90 in the up-down direction V. Therefore, the vehicle drive device 100 can be downsized in the up-down direction V.

The oil reservoir OR is provided in at least one of the rotary electric machine housing chamber S1 (specifically, a lower part of the rotary electric machine housing chamber S1) and the transmission mechanism housing chamber S3 (specifically, a lower part of the transmission mechanism housing chamber S3). In the present embodiment, as shown in FIGS. 4 and 5, the oil reservoir OR is provided over both the rotary electric machine housing chamber S1 and the transmission mechanism housing chamber S3. Although illustration is omitted, a communication hole that communicates the rotary electric machine housing chamber S1 and the transmission mechanism housing chamber S3 is formed in an intermediate wall 28 (see FIG. 3) that demarcates the rotary electric machine housing chamber S1 and the transmission mechanism housing chamber S3. The oil can flow between the rotary electric machine housing chamber S1 and the transmission mechanism housing chamber S3 via the communication hole.

In the example shown in FIG. 5, an oil pump OP is provided in the rotary electric machine housing chamber S1. For example, an electric oil pump to be driven by an electric motor can be used as the oil pump OP. The oil pump OP sucks the oil stored in the oil reservoir OR. The oil discharged from the oil pump OP is supplied, for example, for cooling to cooling target portions (coil end portions 13 etc.) of the rotary electric machine 1. The oil pump OP is disposed in the rotary electric machine housing chamber S1 so as to overlap the output gear 30 in the axial view. By disposing the oil pump OP in this way, the space in the rotary electric machine housing chamber S1 that overlaps the output gear 30 in the axial view is effectively used as the disposition space of the oil pump OP. Thus, the vehicle drive device 100 can be downsized. The oil pump OP is disposed so as not to overlap the rotary electric machine 1 in the axial view.

In the example shown in FIG. 5, the oil pump OP is disposed on the lower side V2 of the first axis C1 and the second axis C2 between the first axis C1 and the second axis C2 in the width direction H. By disposing the oil pump OP between the first axis C1 and the second axis C2 in the width direction H in this way, for example, the oil pump OP and a strainer (not shown) connected thereto can be disposed at or near the central part in the width direction H where the occurrence of air suction can be reduced easily. By disposing the oil pump OP on the lower side V2 of the first axis C1 and the second axis C2, the oil pump OP is disposed near the oil reservoir OR formed in the lower part of the case 2. Thus, it is easier to reduce oil suction resistance.

In the example shown in FIGS. 4 to 6, the oil discharged by the oil pump OP is supplied to the rotary electric machine 1 after passing through an oil cooler 9 (see FIGS. 4 and 6). The oil cooler 9 cools the oil by heat exchange between the oil and a refrigerant. In this example, the oil cooler 9 is a water-cooled oil cooler that uses a coolant as the refrigerant. As shown in FIGS. 4 and 6, the oil cooler 9 is provided with a first connection port P1 for introducing the coolant into the oil cooler 9, and a first connection port P1 for discharging the coolant from the oil cooler 9.

In this example, the first connection ports P1 are disposed on the outer surface of the case 2 on the upper side V1. In this example, the inverter device 90 is provided with a coolant channel for cooling the inverter device 90. As shown in FIG. 6, a second connection port P2 for introducing the coolant into the coolant channel and a second connection port P2 for discharging the coolant from the coolant channel are disposed on the outer surface of the case 2 on the upper side V1. By disposing the first connection ports P1 and the second connection ports P2 on the same outer surface (outer surface on the same side) of the case 2 in this way, an operation for connecting piping members (hoses etc.) to the first connection ports P1 and the second connection ports P2 is facilitated. Further, the cost can be reduced by reducing the lengths of the piping members.

In the example shown in FIG. 6, the oil cooler 9 is disposed across the boundary between the rotary electric machine housing chamber S1 and the transmission mechanism housing chamber S3 in a plan view (view along the up-down direction V). In this example, the outer surface of the case 2 on the upper side V1 has a recess that recedes to the lower side V2. This recess is formed by using an empty space in the internal space of the case 2, and the oil cooler 9 is disposed in this recess (see FIG. 4). Therefore, the oil cooler 9 is disposed between the rotary electric machine housing chamber S1 (specifically, a part of the rotary electric machine housing chamber S1 on the first axial side A1 with respect to the recess) and the transmission mechanism housing chamber S3 (specifically, a part of the transmission mechanism housing chamber S3 on the second axial side A2 with respect to the recess) in the axial direction A. By disposing the oil cooler 9 with the empty space in this way, an increase in the size of the vehicle drive device 100 can be suppressed. In consideration of inclination of the oil surface in the oil reservoir OR formed in the lower part of the case 2 when the vehicle 200 is traveling, the oil pump OP and the strainer (not shown) are often disposed at or near the central part in the axial direction A. By disposing the oil cooler 9 between the rotary electric machine housing chamber S1 and the transmission mechanism housing chamber S3 in the axial direction A as described above, the oil cooler 9 and the set of the oil pump OP and the strainer can be disposed at the same position or close positions in the axial direction A. Thus, complication of oil passages can be suppressed. In the example shown in FIG. 4, the oil cooler 9 is disposed between the first axis C1 and the inverter device 90 in the width direction H.

As shown in FIG. 4, in the present embodiment, the first output member 61 is disposed so as to overlap the rotary electric machine 1 in a view along the second direction Y That is, the first output member 61 is disposed so that the disposition area in the first direction X overlaps the rotary electric machine 1. The first output member 61 is disposed so that a part of the first output member 61 on the first-direction second side X2 overlaps the rotary electric machine 1 in the view along the second direction Y In the present embodiment, the first output member 61 is disposed so as not to overlap the inverter device 90 in the view along the second direction Y The disposition configuration of the components shown in FIG. 4 in the axial view is an example and may be changed as appropriate. For example, the disposition configuration of FIG. 4 may be reversed in the first direction X, in the second direction Y, or in both the first direction X and the second direction Y.

As shown in FIG. 5, the vehicle drive device 100 includes wiring 91 that connects the rotary electric machine 1 and the inverter device 90. Through holes 26 through which the wiring 91 is inserted are formed through the partition wall 25. FIG. 4 shows a disposition relationship of the components of the vehicle drive device 100 in the axial view when the vehicle drive device 100 is viewed from the second axial side A2. FIG. 5 shows a disposition relationship of the components of the vehicle drive device 100 in the axial view when the vehicle drive device 100 is viewed from the first axial side A1. A terminal block including terminals 93 is attached to the through holes 26. Power lines 92 drawn out from the coil end portions 13 and power supply lines (not shown) connected to the inverter device 90 are electrically connected via the terminals 93. The power supply lines, the terminals 93, and the power lines 92 constitute the wiring 91 for transmitting electric power (electric power for driving the rotary electric machine 1 and electric power generated by the rotary electric machine 1) between the rotary electric machine 1 and the inverter device 90. In the present embodiment, three power lines 92 are provided and three through holes 26 are formed in the partition wall 25 based on the fact that the number of phases of alternating current power for driving the rotary electric machine 1 is "3".

As shown in FIG. 5, in the present embodiment, the through holes 26 (in this case, all the three through holes 26) in the vehicle-mounted state are located between the rotary electric machine 1 and the inverter device 90 in the first direction X in the axial view on the upper side V1 of the second axis C2 and at a height (position in the up-down direction V) at which both the rotary electric machine 1 and the inverter device 90 are disposed. The height at which the rotary electric machine 1 is disposed includes a height at which the protruding portion 12b of the stator core 12 described above is disposed. In the example shown in FIG. 5, the through holes 26 (in this case, all the three through holes 26) in the vehicle-mounted state are located between the rotary electric machine 1 and the inverter device 90 in the first direction X in the axial view on the upper side V1 of the first axis C1 and at a height at which both the rotary electric machine 1 and the inverter device 90 are disposed.

As shown in FIGS. 5 and 6, the vehicle drive device 100 includes a breather device 8. The breather device 8 is a device for reducing a pressure difference between the inside and outside of the case 2. The breather device 8 includes a breather chamber 8a that communicates the inside and outside of the case 2. The breather chamber 8a is formed so as to communicate with a space that is inside the case 2 and outside the breather chamber 8a. In the present embodiment, the breather chamber 8a is formed so as to be open to the first axial side A1 (near side in the drawing sheet of FIG. 5), and communicates with the rotary electric machine housing chamber S1 via the opening. Although illustration is omitted in FIG. 5, a cover member is attached to the opening of the breather chamber 8a on the first axial side A1, and air flows between the breather chamber 8a and the rotary electric machine housing chamber S1 via a clearance created between the cover member and the wall of the breather chamber 8a or a hole formed in the cover member.

As described above, in the present embodiment, the breather chamber 8a communicates with the rotary electric machine housing chamber S1 inside the case 2. The rotary electric machine housing chamber S1 communicates with another housing chamber (for example, the transmission mechanism housing chamber S3) inside the case 2 so that air can flow via a hole, a clearance, or the like. Therefore, the pressure difference between the inside and outside of the case 2 can be reduced by forming the breather chamber 8a so that it communicates with the rotary electric machine housing chamber S1.

In the example shown in FIG. 5, a breather hole 8b that communicates the breather chamber 8a and the outside of the case 2 is formed so as to be open in the outer surface of the case 2 on the upper side V1. The breather device 8 includes a breather plug 8c attached to the breather hole 8b from the outside of the case 2. The breather plug 8c is provided to suppress oil leakage from the breather hole 8b to the outside of the case 2 and to suppress entry of water, foreign matter, or the like into the breather hole 8b from the outside of the case 2.

As shown in FIG. 5, the second axis C2 is located on the first widthwise side H1 with respect to the first axis C1. The inverter device 90 is disposed on the first widthwise side H1 with respect to the second axis C2 so that the disposition area in the up-down direction V overlaps the rotary electric machine 1 and the pair of output members 6. Therefore, a target space T shaped so as to be surrounded from three sides that are both sides in the width direction H and the lower side V2 is formed by the outer peripheral surface of the rotary electric machine 1 and the inverter device 90 in the axial view. In the example shown in FIG. 5, the target space T is formed by using the rotary electric machine 1 including the protruding portions 12b described above, and the uppermost part of the target space T is formed between the protruding portion 12b and the inverter device 90 in the width direction H. In the present embodiment, the first axis C1 is located in the disposition area of the output gear 30 in the up-down direction V In the present embodiment, the second axis C2 is located on the lower side V2 of the first axis C1.

The breather chamber 8a is disposed by using the target space T described above. Specifically, as shown in FIG. 5, at least a part of the breather chamber 8a (in this example, at least a lower part of the breather chamber 8a) is disposed between the rotary electric machine 1 and the inverter device 90 in the width direction H, and the disposition area of the at least part of the breather chamber in the up-down direction V overlaps the rotary electric machine 1 and the inverter device 90 and the at least part of the breather chamber is located on the upper side V1 of the first axis C1. At least the part of the breather chamber 8a (in this example, at least the lower part of the breather chamber 8a) is disposed in an area in the up-down direction V where both the rotary electric machine 1 and the inverter device 90 are disposed. By disposing the breather chamber 8a with the target space T in this way, the vehicle drive device 100 can be downsized in the up-down direction V and the width direction H.

As shown in FIG. 5, in the present embodiment, the breather chamber 8a is disposed so as to overlap the wiring 91 (specifically, a part of the wiring 91 that is disposed in the rotary electric machine housing chamber S1) in the axial view. The breather chamber 8a is formed so as to be open to the rotary electric machine housing chamber S1 where the amount of oil scattering is smaller than that in the transmission mechanism housing chamber S3. The wiring 91 is disposed on the upper side V1 in the rotary electric machine housing chamber S1 in order to avoid being immersed in the oil surface to the extent possible. In general, the rotary electric machine housing chamber S1 includes an empty space formed on one side in the axial direction A with respect to the wiring 91 depending on the length of the stator core 12 in the axial direction A. In the example shown in FIG. 5, the wiring 91 is disposed at or near the end of the stator core 12 on the first axial side A1 (near side in the drawing sheet of FIG. 5). Therefore, the empty space is formed on the second axial side A2 (far side in the drawing sheet of FIG. 5) with respect to the wiring 91 depending on the length of the stator core 12 in the axial direction A. By providing the breather chamber 8a at the position where it overlaps the wiring 91 in the axial view, the breather chamber 8a can be formed at the position relatively on the upper side V1 where the oil is less likely to scatter by effectively using the empty space without the need for an additional space or while minimizing the additional space.

In the present embodiment, as shown in FIG. 6, the entire disposition area of the breather chamber 8a in the axial direction A fits in the disposition area of the rotary electric machine 1 in the axial direction A. In the present embodiment, as shown in FIG. 5, the entire disposition area of the breather chamber 8a in the width direction H fits in the disposition area of the rotary electric machine 1 in the width direction H. In the example shown in FIG. 5, a part of the breather chamber 8a on the first widthwise side H1 is disposed in a disposition area of the protruding portion 12b of the rotary electric machine 1 in the width direction H. That is, in the example shown in FIG. 5, the disposition area of the rotary electric machine 1 in the width direction H includes the area where only the protruding portion 12b is disposed. In the present embodiment, as shown in FIG. 6, the breather chamber 8a is disposed so as to overlap at least one of the pair of output members 6 in the up-down view. Specifically, the breather chamber 8a is disposed on the upper side V1 of the pair of output members 6. The breather chamber 8a is disposed so as to overlap the first output member 61 in the up-down view.

When the rotary electric machine 1 and the inverter device 90 are displaced in different directions, a load (for example, a tensile load) may be applied to the wiring 91 to cause a stress in the members (such as busbars) constituting the wiring 91, or a load may be applied to connection portions 94 between different members in the wiring 91 (in the example shown in FIG. 5, bolt-fastening portions between the power lines 92 and the terminals 93). The displacement of the rotary electric machine 1 and the inverter device 90 in different directions may be caused by displacement of the first axis C1 and the second axis C2 in different directions when the driving force is transmitted by the transmission mechanism 3. In this respect, in the example shown in FIG. 5, the rotary electric machine 1 is fixed to the case 2 so that the protruding portion 12b of the stator core 12 fixed to the case 2 by the fastening member 14 is disposed between the wiring 91 (specifically, the connection portions 94) and the output member 6 (specifically, the first output member 61) in the axial view. In other words, the rotary electric machine 1 is fixed to the case 2 so that the connection portions 94, the protruding portion 12b, and the first output member 61 are arranged in a straight line in the axial view. By fixing the rotary electric machine 1 to the case 2 in this way, the displacement of the first axis C1 and the second axis C2 in different directions is unlikely to occur when the driving force is transmitted by the transmission mechanism 3. Thus, a large load is unlikely to be applied to the wiring 91.

In the example shown in FIG. 5, the stator core 12 includes two protruding portions 12b in addition to the protruding portion 12b disposed between the wiring 91 and the output member 6 in the axial view. That is, the stator core 12 includes three protruding portions 12b. The three protruding portions 12b are distributed in a circumferential direction (circumferential direction with respect to the first axis C1). In the example shown in FIG. 5, the three protruding portions 12b are disposed at equal intervals along the circumferential direction. In the example shown in FIG. 5, the rotary electric machine 1 is fixed to the case 2 so that the end of the stator core 12 on the second widthwise side H2 corresponds to the end of the body 12a on the second widthwise side H2 (in other words, all the protruding portions 12b are disposed on the first widthwise side H1 of the end of the body 12a on the second widthwise side H2). Thus, the rotary electric machine 1 can be disposed while suppressing an increase in the size of the vehicle drive device 100 in the width direction H.

OTHER EMBODIMENTS

Next, other embodiments of the vehicle drive device will be described.

(1) In the above embodiment, description has been given of the exemplary configuration in which the second axis C2 is located on the lower side V2 of the first axis C1. However, the present disclosure is not limited to such a configuration, and may employ a configuration in which the second axis C2 is located at the same position in the up-down direction V as that of the first axis C1, or a configuration in which the second axis C2 is located on the upper side V1 of the first axis C1.

(2) In the above embodiment, description has been given of the exemplary configuration in which the first axis C1 is located in the disposition area of the output gear 30 in the up-down direction V. However, the present disclosure is not limited to such a configuration, and may employ a configuration in which the first axis C1 is not located in the disposition area of the output gear 30 in the up-down direction V. For example, the first axis C1 may be located on the upper side V1 of the uppermost part of the output gear 30.

(3) In the above embodiment, description has been given of the exemplary configuration in which the entire disposition area of the breather chamber 8a in the axial direction A fits in the disposition area of the rotary electric machine 1 in the axial direction A, and the entire disposition area of the breather chamber 8a in the width direction H fits in the disposition area of the rotary electric machine 1 in the width direction H. However, the present disclosure is not limited to such a configuration, and may employ a configuration in which the disposition area of the breather chamber 8a in the axial direction A does not fit in the disposition area of the rotary electric machine 1 in the axial direction A. Even in this case, it is preferable that the breather chamber 8a be disposed so that the disposition area in the axial direction A overlaps the rotary electric machine 1. The present disclosure may employ a configuration in which the disposition area of the breather chamber 8a in the width direction H does not fit in the disposition area of the rotary electric machine 1 in the width direction H. Even in this case, it is preferable that the breather chamber 8a be disposed so that the disposition area in the width direction H overlaps the rotary electric machine 1.

(4) In the above embodiment, description has been given of the exemplary configuration in which the breather chamber 8a is disposed so as to overlap at least one of the pair of output members 6 in the up-down view. However, the present disclosure is not limited to such a configuration, and may employ a configuration in which the breather chamber 8a is disposed at a position where it does not overlap any of the pair of output members 6 in the up-down view (specifically, at a different position in the width direction H from those of the pair of output members 6).

(5) In the above embodiment, description has been given of the exemplary configuration in which the breather chamber 8a is disposed so as to overlap the wiring 91 in the axial view. However, the present disclosure is not limited to such a configuration, and may employ a configuration in which the breather chamber 8a is disposed at a position where it does not overlap the wiring 91 in the axial view (for example, a position on the upper side V1 of the wiring 91).

(6) In the above embodiment, description has been given of the exemplary configuration in which the breather chamber 8a communicates with the rotary electric machine housing chamber S1 inside the case 2. However, the present disclosure is not limited to such a configuration, and may employ, for example, a configuration in which the breather chamber 8*a* communicates with the transmission mechanism housing chamber S3 inside the case 2.

(7) In the above embodiment, description has been given of the exemplary configuration in which the oil reservoir OR is provided over both the rotary electric machine housing chamber S1 and the transmission mechanism housing chamber S3. However, the present disclosure is not limited to such a configuration, and may employ, for example, a configuration in which the oil reservoir OR is provided in only one of the rotary electric machine housing chamber S1 and the transmission mechanism housing chamber S3 (for example, only the transmission mechanism housing chamber S3).

(8) In the above embodiment, description has been given of the exemplary configuration in which the transmission mechanism 3 includes the counter gear mechanism 4 in the power transmission path between the rotary electric machine 1 and the output gear 30. However, the present disclosure is not limited to such a configuration, and may employ, for example, a configuration in which an idler gear that meshes with both the input gear 17 and the output gear 30 is provided instead of the counter gear mechanism 4 or the input gear 17 and the output gear 30 mesh with each other.

(9) The configuration disclosed in each of the embodiments described above can be applied in combination with the configurations disclosed in other embodiments (including combinations of embodiments described as the other embodiments) as long as there is no contradiction. Regarding the other configurations as well, the embodiments disclosed herein are merely illustrative in all respects. Therefore, various modifications can be made as appropriate without departing from the spirit of the present disclosure.

Outline of Embodiments Described Above

Hereinafter, the outline of the vehicle drive device described above will be described.

A vehicle drive device (100) includes a rotary electric machine (1), a pair of output members (6) drivingly connected to a pair of wheels (W), a transmission mechanism (3) configured to transmit a driving force between the rotary electric machine (1) and the pair of output members (6), an inverter device (90) configured to control drive of the rotary electric machine (1), a case (2) that houses the inverter device (90), the rotary electric machine (1), and the transmission mechanism (3) and includes an oil reservoir (OR) inside, and a breather device (8) including a breather chamber (8*a*) that communicates an inside and an outside of the case (2). The rotary electric machine (1) and the pair of output members (6) are disposed separately on two parallel axes. Assuming that a first axis (C1) is a rotation axis of the rotary electric machine (1), a second axis (C2) is a rotation axis of the pair of output members (6), an axial direction (A) is a direction parallel to the first axis (C1) and the second axis (C2), a width direction (H) is a direction orthogonal to the axial direction (A) in an up-down view, and a first widthwise side (H1) is one side in the width direction (H), the second axis (C2) is located on the first widthwise side (H1) with respect to the first axis (C1), the inverter device (90) is disposed on the first widthwise side (H1) with respect to the second axis (C2) so that a disposition area in an up-down direction (V) overlaps the rotary electric machine (1) and the pair of output members (6), and at least a part of the breather chamber (8*a*) is disposed between the rotary electric machine (1) and the inverter device (90) in the width direction (H), and a disposition area of the at least part of the breather chamber in the up-down direction (V) overlaps the rotary electric machine (1) and the inverter device (90) and the at least part of the breather chamber is located on an upper side (V1) of the first axis (C1).

According to this configuration, the inverter device (90) is disposed so that the disposition area in the up-down direction (V) overlaps the rotary electric machine (1) and the pair of output members (6). Therefore, it is possible to suppress an increase in the size of the vehicle drive device (100) in the up-down direction (V) due to the disposition of the inverter device (90). In this configuration, the second axis (C2) is located on the first widthwise side (H1) with respect to the first axis (C1), and the inverter device (90) is disposed on the first widthwise side (H1) with respect to the second axis (C2). Therefore, a space (hereinafter referred to as "target space (T)") shaped so as to be surrounded from three sides that are both sides in the width direction (H) and a lower side (V2) is formed by the outer peripheral surface of the rotary electric machine (1) and the inverter device (90) in an axial view along the axial direction (A). According to this configuration, the breather chamber (8*a*) can be disposed by using the target space (T). Therefore, the amount of protrusion of the breather device (8) including the breather chamber (8*a*) in the up-down direction (V) (specifically, the amount of protrusion from the uppermost part of the case (2) in the axial view) can easily be reduced, and the vehicle drive device (100) can easily be downsized in the up-down direction (V).

By disposing the breather chamber (8*a*) with the target space (T) as described above, at least a part of the breather chamber (8*a*) can easily be disposed in an area in the axial direction (A) where at least one of the rotary electric machine (1) and the inverter device (90) is disposed. Therefore, according to this configuration, the vehicle drive device (100) can easily be downsized in the axial direction (A).

As described above, with this configuration, the downsizing of the vehicle drive device (100) is facilitated when the vehicle drive device (100) includes the inverter device (90) and the breather device (8).

It is preferable that the transmission mechanism (3) include a differential gear mechanism (5) configured to distribute the driving force transmitted from the rotary electric machine (1) side to the pair of output members (6), and an output gear (30) drivingly connected to the pair of output members (6) coaxially with the pair of output members (6), the output gear (30) be connected to a differential case (50) of the differential gear mechanism (5) so as to rotate integrally with the differential case (50), and the first axis (C1) be located in a disposition area of the output gear (30) in the up-down direction (V).

According to this configuration, the overlapping ratio between the disposition areas of the rotary electric machine (1) and the output gear (30) in the up-down direction (V) can easily be increased compared to a case where the first axis (C1) is not located in the disposition area of the output gear (30) in the up-down direction (V). Therefore, the vehicle drive device (100) can easily be downsized in the up-down direction (V).

In the above configuration, it is preferable that the second axis (C2) be located on a lower side (V2) of the first axis (C1).

According to this configuration, a large space can easily be secured in the up-down direction (V) as the above target space (T) to be used for disposing the breather chamber (8a) compared to a case where the second axis (C2) is located on the upper side (V1) of the first axis (C1). Therefore, the breather chamber (8a) can easily be disposed so as to reduce the amount of protrusion of the breather device (8) in the up-down direction (V).

In each of the above configurations, it is preferable that an entire disposition area of the breather chamber (8a) in the axial direction (A) fit in a disposition area of the rotary electric machine (1) in the axial direction (A).

According to this configuration, it is possible to suppress an increase in the dimension of the vehicle drive device (100) in the axial direction (A) due to the disposition of the breather chamber (8a), thereby facilitating the downsizing of the vehicle drive device (100) in the axial direction (A).

It is preferable that the case (2) include a rotary electric machine housing chamber (S1) that houses the rotary electric machine (1), and a transmission mechanism housing chamber (S3) that houses the transmission mechanism (3), the rotary electric machine housing chamber (S1) and the transmission mechanism housing chamber (S3) be arranged in the axial direction (A), and the breather chamber (8a) communicate with the rotary electric machine housing chamber (S1) inside the case (2).

According to this configuration, for example, when the oil is raked up to the upper part of the transmission mechanism housing chamber (S3) due to the rotation of each gear constituting the transmission mechanism (3), the raked oil is unlikely to reach the breather chamber (8a). Therefore, it is easy to avoid complication of the shape of the breather chamber (8a) for restricting the entry of the oil into the breather chamber (8a).

In the above configuration, it is preferable that the oil reservoir (OR) be provided over both the rotary electric machine housing chamber (S1) and the transmission mechanism housing chamber (S3).

According to this configuration, it is easy to secure a sufficient amount of oil in the case (2) while avoiding an excessive increase in the oil level of the oil reservoir (OR) compared to a case where the oil reservoir (OR) is provided in only one of the rotary electric machine housing chamber (S1) and the transmission mechanism housing chamber (S3). Therefore, the amount of oil necessary for lubrication or cooling can appropriately be supplied to each part of the vehicle drive device (100) while suppressing agitation of the oil by the gears constituting the transmission mechanism (3) to reduce the loss of the driving force due to the agitation of the oil.

In each of the above configurations, it is preferable that wiring (91) that connects the rotary electric machine (1) and the inverter device (90) be provided, and the breather chamber (8a) be disposed so as to overlap the wiring (91) in an axial view along the axial direction (A).

According to this configuration, the vehicle drive device (100) can easily be downsized in the width direction (H) and the up-down direction (V) compared to a case where the breather chamber (8a) is disposed so as not to overlap the wiring (91) in the axial view. It is generally desirable that both the breather chamber (8a) and the wiring (91) be disposed at positions on a relatively upper side (V1) where the oil is less likely to scatter. According to this configuration, the breather chamber (8a) and the wiring (91) can be disposed in the same area in the up-down direction (V) by shifting their disposition positions in the axial direction (A). Therefore, both of them can be disposed at the positions on the relatively upper side (V1).

It is preferable that the breather chamber (8a) be disposed so as to overlap at least one of the pair of output members (6) in the up-down view.

According to this configuration, the vehicle drive device (100) can easily be downsized in the width direction (H) compared to a case where the breather chamber (8a) is disposed so as not to overlap any of the pair of output members (6) in the up-down view.

It is preferable that an entire disposition area of the breather chamber (8a) in the width direction (H) fit in a disposition area of the rotary electric machine (1) in the width direction (H).

According to this configuration, it is possible to suppress an increase in the dimension of the vehicle drive device (100) in the width direction (H) due to the disposition of the breather chamber (8a), thereby facilitating the downsizing of the vehicle drive device (100) in the width direction (H).

The vehicle drive device according to the present disclosure may attain at least one of the effects described above.

DESCRIPTION OF THE REFERENCE NUMERALS

1: rotary electric machine, 2: case, 3: transmission mechanism, 5: differential gear mechanism, 6: output member, 8: breather device, 8a: breather chamber, 30: output gear, 50: differential case, 90: inverter device, 91: wiring, 100: vehicle drive device, A: axial direction, C1: first axis, C2: second axis, H: width direction, H1: first widthwise side, OR: oil reservoir, S1: rotary electric machine housing chamber, S3: transmission mechanism housing chamber, V: up-down direction, V1: upper side, V2: lower side, W: wheel

The invention claimed is:

1. A vehicle drive device comprising:
a rotary electric machine;
a pair of output members drivingly connected to a pair of wheels;
a transmission mechanism configured to transmit a driving force between the rotary electric machine and the pair of output members;
an inverter device configured to control drive of the rotary electric machine;
a case that houses the inverter device, the rotary electric machine, and the transmission mechanism and includes an oil reservoir inside; and
a breather device including a breather chamber that communicates an inside and an outside of the case, wherein:
the rotary electric machine and the pair of output members are disposed separately on two parallel axes;
a first axis is a rotation axis of the rotary electric machine, a second axis is a rotation axis of the pair of output members, an axial direction is a direction parallel to the first axis and the second axis, a width direction is a direction orthogonal to the axial direction in an up-down view, and a first widthwise side is one side in the width direction, the second axis is located on the first widthwise side with respect to the first axis;
the inverter device is disposed on the first widthwise side with respect to the second axis so that a disposition area in an up-down direction overlaps the rotary electric machine and the pair of output members; and
at least a part of the breather chamber is disposed between the rotary electric machine and the inverter device in the width direction, and a disposition area of the at least part of the breather chamber in the up-down direction overlaps the rotary electric machine and the inverter device and the at least part of the breather chamber is located on an upper side of the first axis.

2. The vehicle drive device according to claim 1, wherein:
the transmission mechanism includes a differential gear mechanism configured to distribute the driving force transmitted from a rotary electric machine side to the pair of output members, and an output gear drivingly connected to the pair of output members and arranged coaxially with the pair of output members;
the output gear is connected to a differential case of the differential gear mechanism so as to rotate integrally with the differential case; and
the first axis is located in a disposition area of the output gear in the up-down direction.

3. The vehicle drive device according to claim 2, wherein the second axis is located on a lower side of the first axis.

4. The vehicle drive device according to claim 1, wherein an entire disposition area of the breather chamber in the axial direction fits in a disposition area of the rotary electric machine in the axial direction.

5. The vehicle drive device according to claim 1, wherein:
the case includes a rotary electric machine housing chamber that houses the rotary electric machine, and a transmission mechanism housing chamber that houses the transmission mechanism;
the rotary electric machine housing chamber and the transmission mechanism housing chamber are arranged in the axial direction; and
the breather chamber communicates with the rotary electric machine housing chamber inside the case.

6. The vehicle drive device according to claim 5, wherein the oil reservoir is provided over both the rotary electric machine housing chamber and the transmission mechanism housing chamber.

7. The vehicle drive device according to claim 1, further comprising wiring that connects the rotary electric machine and the inverter device, wherein the breather chamber is disposed so as to overlap the wiring in an axial view along the axial direction.

8. The vehicle drive device according to claim 1, wherein the breather chamber is disposed so as to overlap at least one of the pair of output members in the up-down view.

9. The vehicle drive device according to claim 1, wherein an entire disposition area of the breather chamber in the width direction fits in a disposition area of the rotary electric machine in the width direction.

* * * * *